US009603046B2

(12) United States Patent
Seo et al.

(10) Patent No.: US 9,603,046 B2
(45) Date of Patent: Mar. 21, 2017

(54) METHOD FOR UPLOADING DATA BY STATION, METHOD FOR DOWNLOADING DATA BY STATION AND METHOD FOR DOWNLOADING BY TRANSPORTER

(71) Applicant: LG ELECTRONICS INC., Seoul (KR)

(72) Inventors: Hanbyul Seo, Anyang-si (KR); Dongku Kim, Seoul (KR); Jihong Park, Seoul (KR); Byounghoon Kim, Anyang-si (KR); Kaibin Huang, Hong Kong (CN)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 189 days.

(21) Appl. No.: 13/895,169

(22) Filed: May 15, 2013

(65) Prior Publication Data

US 2013/0322245 A1    Dec. 5, 2013

Related U.S. Application Data

(60) Provisional application No. 61/647,507, filed on May 15, 2012.

(51) Int. Cl.
| | | |
|---|---|---|
| *H04W 4/00* | (2009.01) | |
| *H04W 28/02* | (2009.01) | |
| *G06Q 10/04* | (2012.01) | |
| *G08G 1/00* | (2006.01) | |

(52) U.S. Cl.
CPC ...... *H04W 28/0247* (2013.01); *G06Q 10/047* (2013.01); *G08G 1/202* (2013.01); *H04W 4/001* (2013.01)

(58) Field of Classification Search
USPC ........ 370/311, 318, 232, 235; 455/458, 515, 455/552.1, 553.1, 557
See application file for complete search history.

(56) References Cited

U.S. PATENT DOCUMENTS

| | | | | |
|---|---|---|---|---|
| 2006/0068840 | A1* | 3/2006 | Sherman | G06Q 10/06 701/1 |
| 2006/0149463 | A1* | 7/2006 | Machii et al. | 701/209 |
| 2006/0285529 | A1* | 12/2006 | Hares et al. | 370/338 |
| 2008/0018493 | A1* | 1/2008 | Curtis | 340/901 |
| 2009/0129306 | A1* | 5/2009 | Twitchell et al. | 370/311 |
| 2011/0029609 | A1* | 2/2011 | Kavallierou et al. | 709/204 |
| 2011/0164562 | A1* | 7/2011 | Qiu et al. | 370/328 |
| 2012/0079074 | A1* | 3/2012 | Mccormack | 709/217 |
| 2014/0210644 | A1* | 7/2014 | Breed | G01S 17/936 340/905 |

* cited by examiner

*Primary Examiner* — Zewdu A Beyen
(74) *Attorney, Agent, or Firm* — Dentons US LLP (57) ABSTRACT

The present invention provides methods and devices for transporting data from a station (hereinafter source station) to another station (hereinafter target station) by using a transporter. According to the present invention, route information of the transporter is provided to the source station, and the source station determines whether to use the transporter for transporting the data from the source station to the target station.

7 Claims, 6 Drawing Sheets

METHOD FOR UPLOADING DATA BY STATION, METHOD FOR DOWNLOADING DATA BY STATION AND METHOD FOR DOWNLOADING BY TRANSPORTER

CROSS-REFERENCE TO RELATED APPLICATIONS

This application claims the benefit of the U.S. Provisional Application No. 61/647,507, filed on May 15, 2012, the contents of which are incorporated by reference herein in their entirety.

BACKGROUND OF THE INVENTION

Field of the Invention

The present invention relates to a wireless communication system, and more particularly, to a method and an apparatus for transmitting or receiving signals.

Discussion of the Related Art

Exponentially increasing mobile Internet traffic has already reached 0.6 million terabytes per month as of 2011, and is expected to maintain 92% annual growth by 2015. Coping with this bursting traffic becomes one of the most major challenges in recent and future wireless communication networks. Since wireless communication technologies have almost reached their fundamental capacity limits under exhausting radio frequency bands, its solution resort to additional aid of overall network. Such techniques, however, fundamentally rely on internet protocol (IP) backhaul connections under all-IP-based mobile network environment, which are not free from similar traffic excess problem as well with the amount of annually 32% increment. To make matters worse, this plethora of backhauling approaches results in steeply increasing cost of both network deployment and operation.

Accordingly, methods for offloading excessive data traffic on the network with the over the air and/or the backhaul are required.

SUMMARY OF THE INVENTION

The present invention is directed to a network framework that can resolve aforementioned traffic bursting problem 1) without depending on IP backhaul connections 2) while ensuring less expensive operating cost.

It is to be understood that technical objects to be achieved by the present invention are not limited to the aforementioned technical objects and other technical objects which are not mentioned will be apparent from the following description to the person with an ordinary skill in the art to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for uploading data by a station is provided. The method comprises: broadcasting, by the station, a wake-up signal; receiving, by the station, a response signal including route information of a transporter in response to the wake-up signal; and uploading data destined for a specific station on the transporter when the route information includes the specific station.

In the aspect of the present invention, the method may further comprise transmitting a message indicating transportation initiation of the data destined for the specific station to a control center.

In the aspect of the present invention, the method may further comprise retrieving an optimal route of the transporter from a control center. The data destined for the specific station may be uploaded on the transporter when the optimal route of the transporter is the same as the route information and the route information includes the route information includes the specific station.

In the aspect of the present invention, the method may further comprise retrieving an optimal route of the transporter from a control center; and updating the route information with the optimal route of the transporter when the route information and the optimal route of the transporter are different. The data destined for the specific station may be uploaded on the transporter when the updated route information includes the route information includes the specific station.

In the aspect of the present invention, the method may further comprise receiving a control signal requesting the station to re-transport a part of data destined for the specific station via a re-transporter; and uploading the part of the data destined for the specific station on the re-transporter.

As another aspect of the present invention, a method for downloading data by a station is provided. The method comprises broadcasting, by the station, a wake-up signal; receiving, by the station, a response signal from a transporter in response to the wake-up signal; and performing data downloading from the transporter when the transporter has data destined for the station.

In another aspect of the present invention, the method may further comprise transmitting a message indicating transportation completion to a control center when the data downloading is complete.

As further aspect of the present invention, a method for downloading data by a transporter may be provided. The method comprises: receiving, by the transporter, a wake-up signal; transmitting, by the transporter, a response signal including route information of the transporter to a station in response to the wake-up signal; and downloading, by the transporter, data destined for a specific station from the station, wherein the route information includes the specific station.

In the further aspect of the present invention, the wake-up signal may be received from the station or a control center to which the station and the transporter is connected.

In the further aspect of the present invention, the method may further comprise: uploading, by the transporter, the data destined for the specific station to the specific station when the transporter arrives at the specific station.

As still further aspect of the present invention, a device configured to perform any one of the methods according to any aspect of the present invention is provided.

It is to be understood that both the foregoing general description and the following detailed description of the present invention are exemplary and explanatory and are intended to provide further explanation of the invention as claimed.

The aforementioned technical solutions are only a part of the embodiments of the present invention, and various modifications to which technical features of the present invention are applied could be understood by those of ordinary skill in the art to which the present invention pertains, based on the following detailed description of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the preferred embodiments of the present invention will be described with reference to the accompanying drawings. It is to be understood that the detailed description, which will be disclosed along with the accompanying drawings, is intended to describe exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters.

In some cases, to prevent ambiguity in the concept of the present invention f, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) denotes a mobile or fixed type user terminal. Examples of the user equipment include various equipments that transmit and receive user data and/or various kinds of control information to and from a base station. The user equipment may be referred to as a terminal equipment (TE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

Each component performing the present invention or implemented in accordance with the present invention is a kind of a UE or BS. For example the present invention can be implemented by any one of the following components: "station", "control center", "vehicle (also referred to as transporter)" and "re-transporter". In the present invention, the vehicle and/or (re-)transporter may be considered to as a UE, and the station and/or control center may be considered to as a BS.

As stated before, new methods for offloading data traffic are required to resolve the traffic bursting problem in the network using the IP backhaul connections and the wireless connections. As methods for offloading data traffic from the network, methods utilizing existing WiFi (Wireless-Fidelity) access points or deploying femto-cell base stations may be considered. These methods, however, are dependent on IP backhaul assistances, which are expected to limit offloading capacity in future due to the exponentially increasing data traffic of IP backhauls itself. Furthermore, they will give rise to no longer negligible backhaul cost for its deployment and operation in a future network design. The forecast "Crucial Economics for Mobile Backhaus", which is empowered on 2011, shows at least nearly 50% total cost reduction by only redesigning backhaul structure under the long term evolution (LTE) environment with small cell deployment, implying the importance of backhaul design in cost perspective.

To overcome these problems, by contrast to the existing schemes, the present invention, hereinafter, proposes an inexpensive but offloading-capable backhaul network comprising mechanically operating data transporters. Specifically, the network according to the present invention may be applicable to delay insensitive bulky data. For example, the present invention may transport bulky data (e.g., massive data stored at a server) through mechanically moving transporters such as cars and public transportations, enabling to achieve huge traffic offloading amount without IP backhaul dependency while maintaining less expensive operating cost. As in store-carry-forward relaying, data loading and unloading are only allowed at a data source and its corresponding destination with extremely high rate transmission techniques, such as 60 GHz-based wireless transmitting or even physical loading of storage disk drives. Hereinafter the present invention is described in terms of network framework, route-aware transportability, data up/downloading methods and delay QoS control, respectively.

<Aspect A. Network Framework>

The present invention exploits randomly traveling vehicular traffic to resolve aforementioned traffic bursting problems. Exploiting randomly traveling vehicular provides a large number of data transporters with inexpensive operating cost while keeping independence of IP backhaul. To handle its randomness the network according to the present invention may exploit vehicles' ongoing routes information. Moreover, as one of the main objectives of the proposed network is to offload huge data traffic, the present invention compensates long mechanically transporting delay by considering bulky data, thereby ensuring high traffic offloading rate. Dealing with bulky-scaled data, however, may incur catastrophic results to users even with a single outage event. Centralized and strict QoS control is considered in the present invention for counteracting this shortcoming.

A-1. Network Framework for Vehicular Traffic Aided Massive Data Transportations

Figure 1:
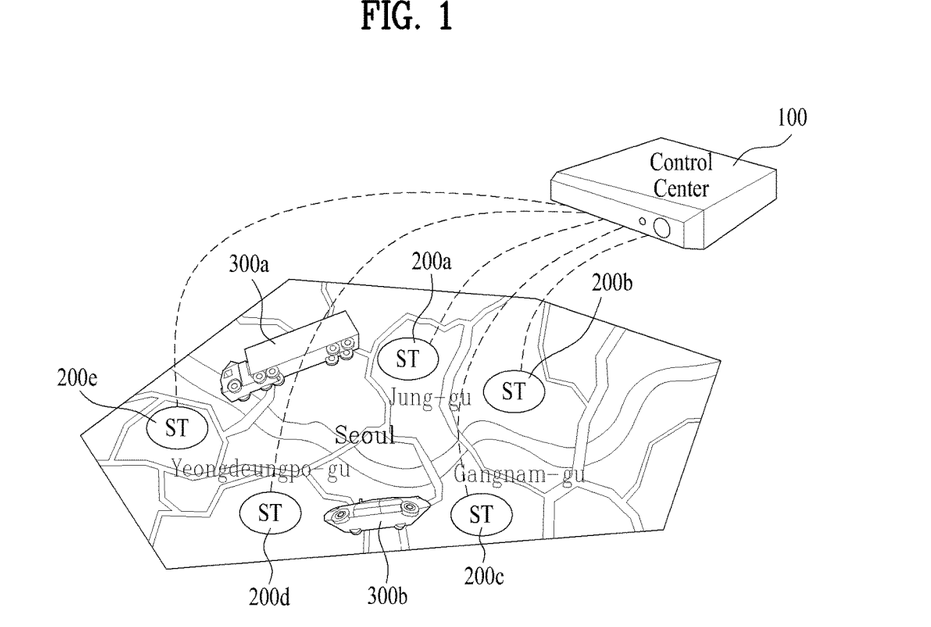
FIG. 1 and FIG. 2 show examples of network implementations under downtown and inter-urban scenarios, respectively, according to an aspect of the present invention.
Figure 2:
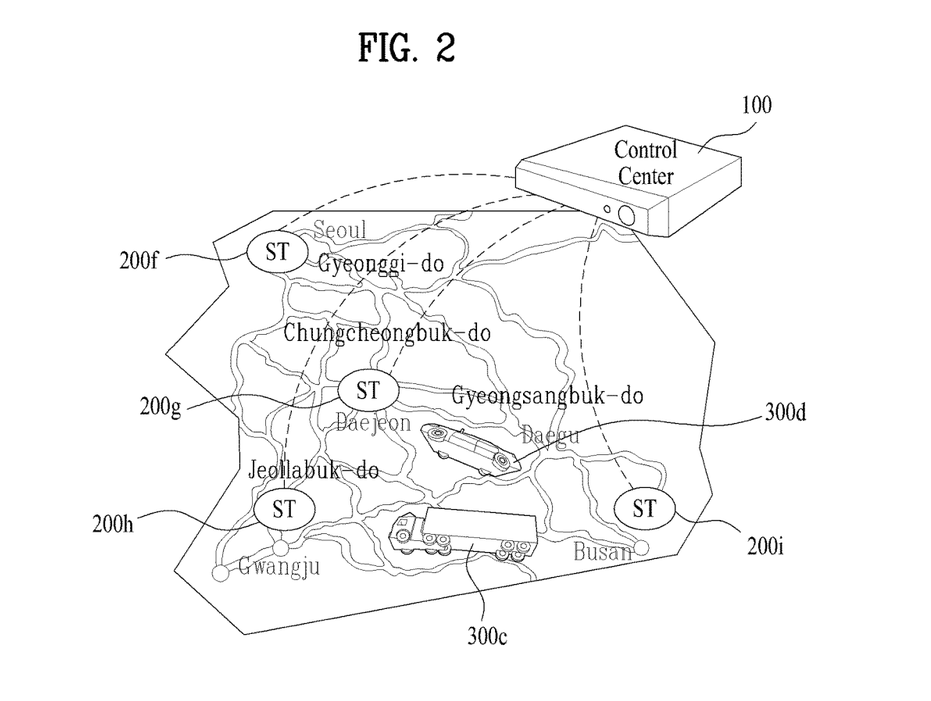

FIG. 1 and FIG. 2 show examples of network implementations under downtown and inter-urban scenarios, respectively, according to an aspect of the present invention.

Referring to FIG. 1 and FIG. 2, stations (STs) (200*a* to 200*i*, hereinafter denoted by 200) are located at certain roadway intersections where vehicular traffic is highly concentrated. They are able to up/downloading data and store the data as buffers. In the present invention, a "data bulk" is unit transporting data size, each of which has its own destination information with the corresponding maximum delay threshold. A vehicle equipped or attached with a transceiver (also referred to as a radio frequency (RF) unit) can be a data transporter (300*a* to 300*d*, hereinafter denoted by 300) if its traveling destination corresponds to a destination of any data bulk that is stored at its passing through station. Data loss occurs when a data bulk cannot be transported within its given delay threshold. The present invention may adopt re-transporter(s) for the data bulk to be transported within its given delay threshold, thereby avoiding data loss of the data bulk. In the present invention, overall data transportations and their QoS may be controlled by a control center (100) in a centralized manner, which may be connected to stations (300) via cellular backhaul. The network according to the present invention may be configured with the control center (100), station (200), vehicle (300) and re-transporter which may perform or have the following features.

1. Station
   up/downloading data bulks to/from transporters;
   able to store a large number of data bulks;
   connected to control center via cellular backhaul for exchanging network control signals and optimal route information;
   knowing the destination of each data bulk containing its own destination information;
   having knowledge of optimal route to any neighboring station by the aid of control center; and/or
   determining transportability of arrived vehicles.
2. Control center
   organizing and helping to exchange control signals among stations for guaranteeing delay QoS of data bulks;
   having high computing power, large history of vehicular traffic patterns, and its corresponding pre-calculated optimal routes information for major roadways;
   regularly calculating all the optimal routes for both stations and vehicles passing through the stations; and/or
   regularly updating optimal routes information to stations via cellular backhaul.
3. Vehicle (transporter)
   able to transport data bulks if its traveling destination is the same as the data bulks';
   having own traveling destination at car navigation system, which may not be the same as the data bulk's stored in a station;
   sharing its on-going route information to the destination with the attached transceiver; and/or
   equipped with transceiver enabling data bulk loading/unloading of transporters at stations.
4. Re-transporter
   regularly transporting accumulated data losses whose delay exceed given thresholds, guaranteeing delay QoS (Quality of Service);
   operated by stations, independent of general vehicles; and/or
   able to transport much larger amount of data in a single transportation.

Figure 3:
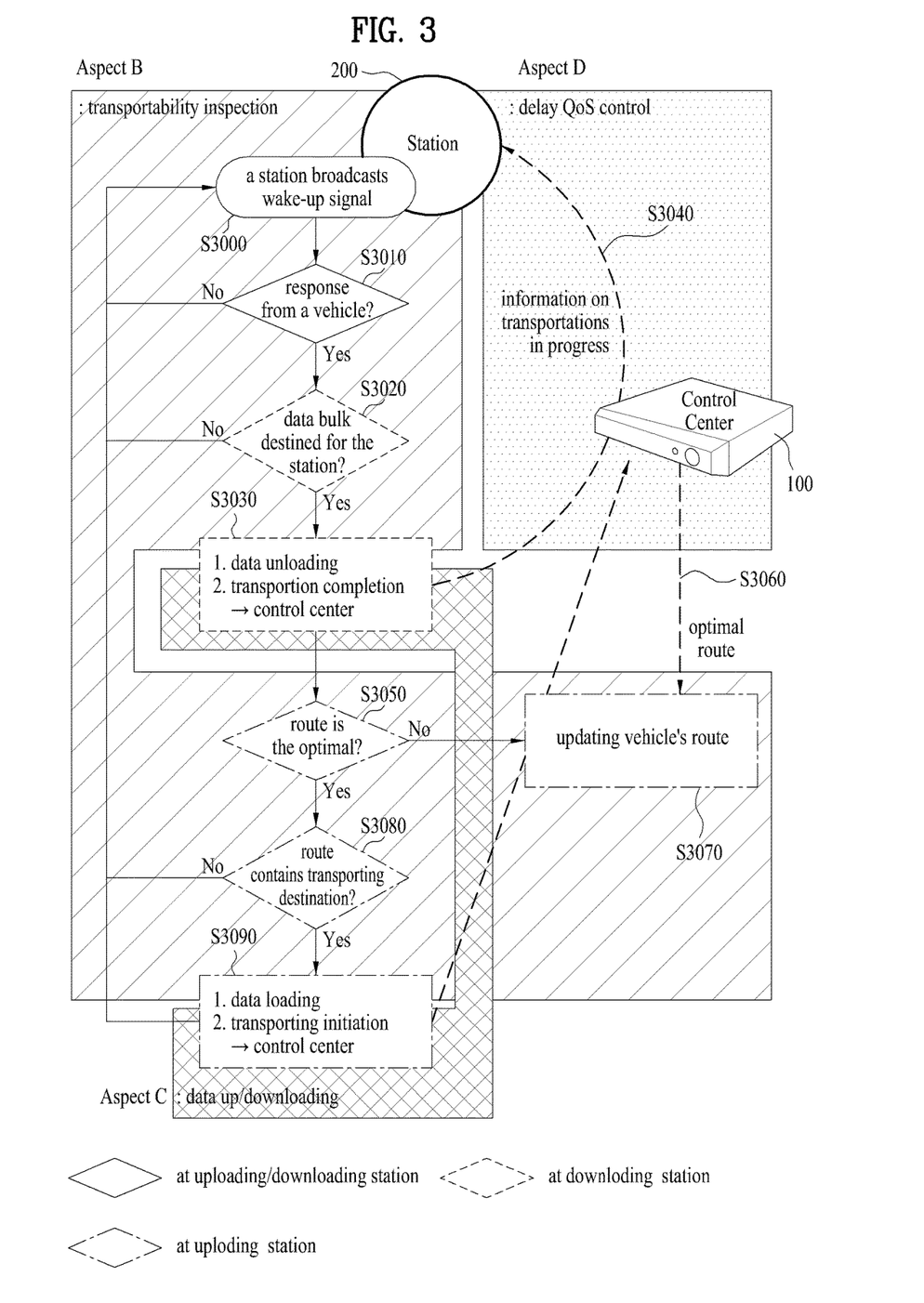
FIG. 3 shows an example of massive data transportations according to the present invention.

The methods for uploading/downloading under the network of the Aspect A according to the present invention are described. FIG. 3 shows an example of massive data transportations according to the present invention.

<Aspect B. Route-aware Transportability Inspection>

Referring to FIG. 3, under the proposed network in the Aspect A, a station (200) broadcasts a wake-up signal (or a paging signal) (S3000). The wake-up signal may include information on the station (200). A vehicle according to the present invention may transmit a response signal to the station if the vehicle arrives at or come close to the station (200) to receive the wake-up signal. If the station (200) receives a response from a vehicle (S3010, Yes), the station determines whether a vehicle that arrives at the station (200) or transmits the response to station (200) can be a data transporter (300) or not (S3020). In the perspective of data transportation, the station (200) is interested in minimizing data transporting time to its destination. Likewise, the vehicle arrived at or close to the station (200) prefers to minimize its traversal time to its own destination. If both destinations of the station and vehicle are the same, their objectives can be unified. This enables the station (200) to determine transportability of the vehicle by simply inspecting route information of the vehicle. The fact every station knows the optimal route for any case gives rise to two possible scenarios: 1) the vehicle has the optimal route information which is the same as the station's by sharing road traffic information through its car navigation system (Aspect B-1) and 2) vehicle's route information is not the same as the station's (Aspect B-2).

B-1. Handshaking Under Perfect Route Information

Route information exchange between stations and their corresponding arrived vehicles ensures to determine transportability. Referring to FIG. 3, the specific procedure in view of data loading (also referred to as uploading) according to the present invention may be as follows.

Step 1: A vehicle arrives at a certain station (200) when the vehicle responds to the wake-up signal (S3010) which is sent by the certain station (200) (S3000).

Step 2: When responding back to the station's wake-up signal (S3010), the vehicle may send its remaining traversal route information to the station (300).

Step 3: The station (200) may conclude the vehicle can be its transporter (300) if the received route information includes any station(s), where data bulk(s) in the station is (are) supposed to be transported, in a route of the vehicle (S3080, Yes).

Step 4: The station (200) may appoint the vehicle as its transporter (300) and upload an appropriate data bulk to the transporter (S3090, 1). The station (200) may transmit a message indicating transportation initiation to at least one of the vehicle appointed as the transporter (300) and the control center (S3090, 2).

B-2. Route Updating and Handshaking Under Imperfect Route Information

Route information exchange between stations and their corresponding arrived vehicles ensures to determine transportability. The only difference of the following procedure from the procedure stated above is the additional steps: 2-*a* and 2-*b*.

Referring to FIG. 3, another procedure in view of data loading according to the present invention may be as follows.

Step 1: A vehicle arrives at a certain station (200) when the vehicle responds to the wake-up signal (S3010) which is sent by the certain station (200) (S3000).

Step 2: When responding back to the station's wake-up signal (S3010), the vehicle may send its remaining traversal route information to the station (300).

2-*a*: Given the received route information, the station (300) may retrieve the optimal (traversal) route for the vehicle (to the vehicle's final destination) from a control center (100). The optimal route may be provided by the control center (100) (S3060).

If the retrieved route is the same as a route in the received route information (S3050, Yes), it may go to Step 3.

2-b: If the retrieved route is not the same as the route in the received route information (S3050, No), the station (200) may update the vehicle's route information (S3070) with the optimal route. The optimal route may be provided by the control center (100) (S3060).

Step 3: The station (200) may conclude the vehicle can be its transporter (300) if the received route information or the updated route information includes any station(s), where data bulk(s) in the station is(are) supposed to be transported, in a route of the vehicle (S3080, Yes).

Step 4: The station (200) may appoint the vehicle as its transporter (300) and upload an appropriate data bulk to the transporter (S3090, 1). The station (200) may transmit a message indicating transportation initiation to at least one of the vehicle appointed as the transporter (300) and the control center (S3090, 2).

<Aspect C. Data Up/Downloading Methods>

The present invention aims at enabling massive data up/downloading within very short duration for minimizing to affect vehicle traffic. One possible way is utilizing short-range-but-high-rate wireless data transfer technologies such as 60 GHz-based antenna array. State-of-the-art 60 GHz-based standards provide the following data transfer rates with the corresponding environments.

WiGig (Wireless Gigabite Alliance) 1.1: ~7 Gbps (~10 meters)

802.11ac: ~0.9 Gbps (single antenna)/~7 Gbps (8×8 antennas)

Wireless HD (Wireless High Definition): ~4 Gbps (version 1.0)/~28 Gbps (version 1.1)

On the other hand, the data transfer scheme does not necessarily have to depend on wireless technology via electromagnetic wave, but is viable through physically exchanging data bulk. For example, the following methods may be used to physically exchanging data bulk.

C-1. Short-Range Wireless Transfer Via Massive Antenna Array

Figure 4:
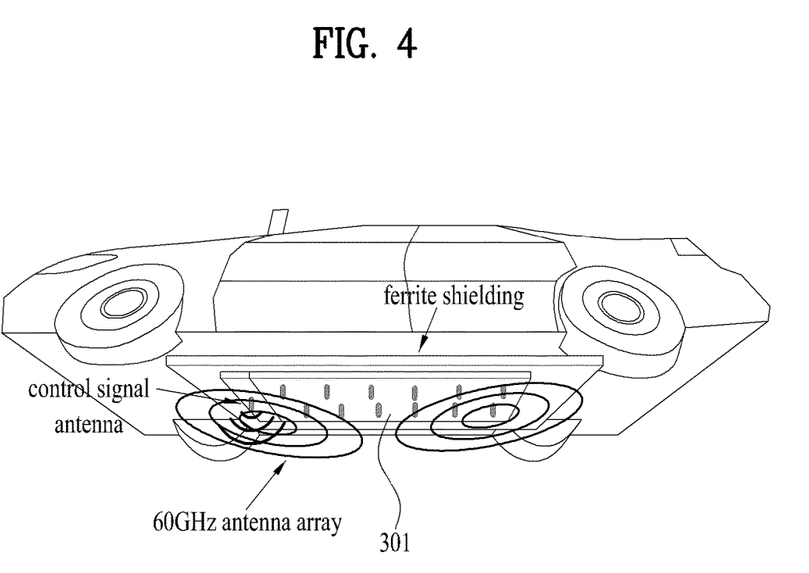
FIG. 4 and FIG. 5 show examples of transceiver according to an embodiment of the present invention.
Figure 5:
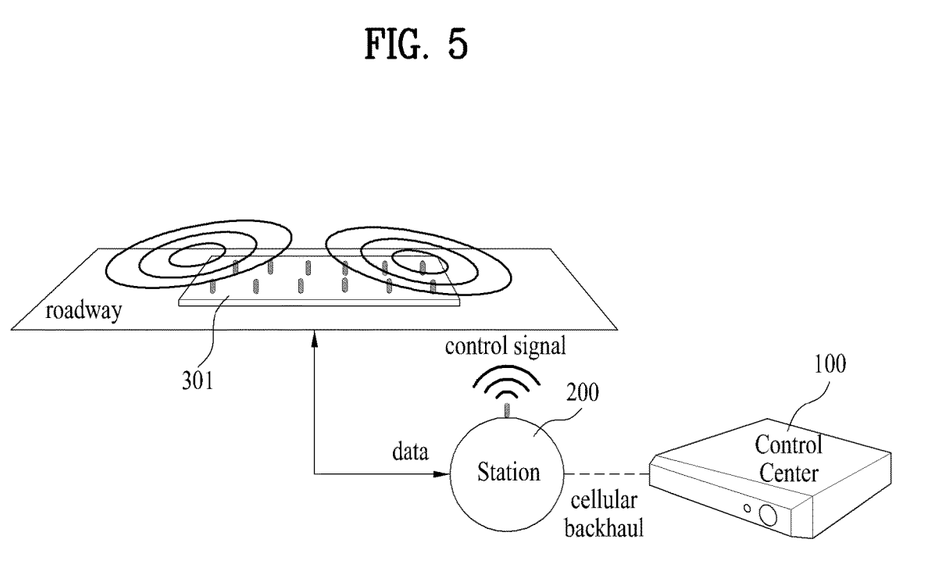

FIG. 4 and FIG. 5 show examples of transceiver according to an embodiment of the present invention. Especially, FIG. 4 shows an example of a transceiver at a vehicle and FIG. 5 shows an example of a transceiver at a station. Even if FIG. 4 and FIG. show transceivers with 60 GHz antenna array, other types of antenna or antenna array may be also used for the present invention.

Referring to FIG. 4 and FIG. 5, transceivers at both station(s) (200) and vehicle(s) (300) may have the same structure except for the fact that the one (301) at vehicle(s) (300) might be attached on a ferrite plate to protect inside passengers and neighboring electronic devices as well from high intensity of electromagnetic waves.

C-2. Storage Swap

Figure 6:
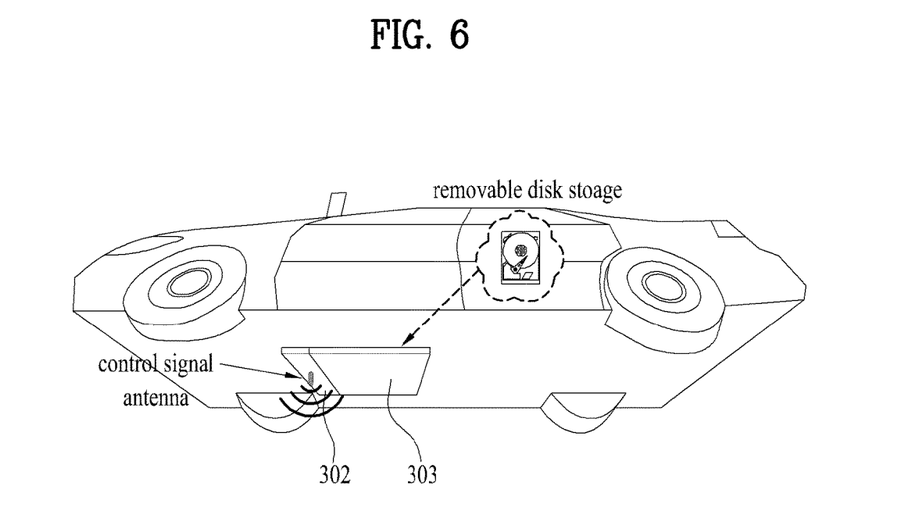
FIG. 6 and FIG. 7 show examples of transceiver according to another embodiment of the present invention.
Figure 7:
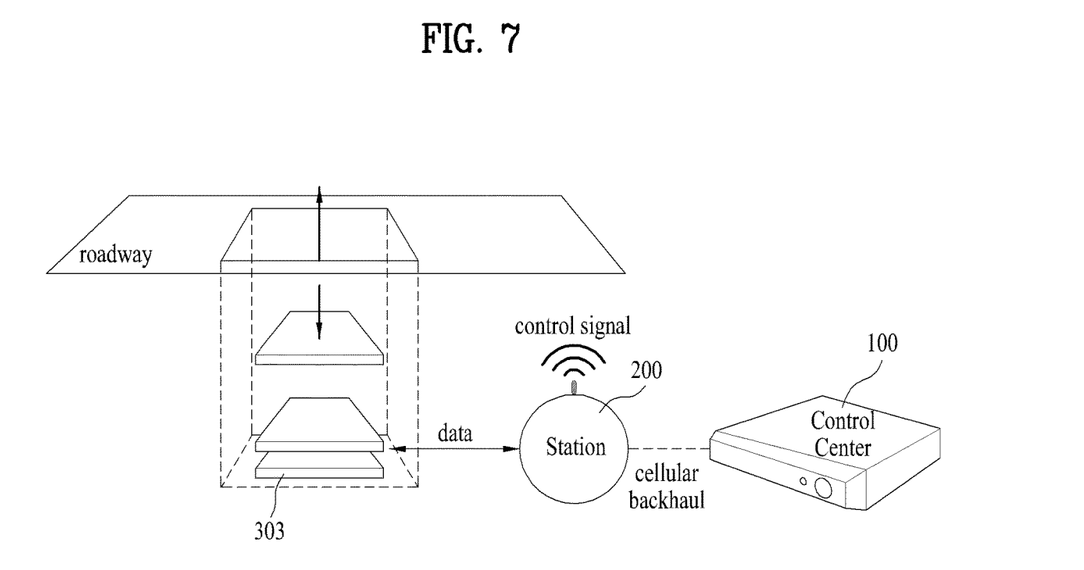

FIG. 6 and FIG. 7 show examples of transceiver according to another embodiment of the present invention. Especially FIG. 6 and FIG. 7 show storage swap transceivers at a transporter and a station, respectively.

Referring to FIG. 6, removable storages (303) may be installed at vehicle(s) (200). A transceiver at vehicle comprises: a part (302) for communicating control signals and route information with a station (200) and a removable storage (303) for data transfer. Referring to FIG. 7, the counterpart at a station may be mechanically operated and able to exchange removable storages with vehicles autonomously or exchange data of the removable storages. Exchanging the removable storages or data of the removable storages comprises moving a storage or data of the storage from a vehicle to a station, a storage or data of the storage from the station to the vehicle, and both. Similarly, in the present invention the term "uploading data" comprises the meaning of transmitting the data to an external device and the meaning of moving a storage storing the data out to the external device, and the term "downloading data" comprises the meaning of receiving the data from an external device and the meaning of moving a storage storing the data in from the external device.

The control signals transmitted by a station (200) may include a wake-up signal broadcast by the station (200), a message designating a vehicle as a data transporter (300) of the present invention, a message indicating data transporting completion in case of data unloading by the station (200), a message indicating data transporting initiation in case of data uploading by the station (200) and etc. The transceiver at the vehicle may receive control signals such as wake-up signal broadcast and a message designating the vehicle as a data transporter (300) via its antenna(s) (301, 302) and/or transmit signals such as response to the wake-up signal, route information and data bulk to a station (200) via its antenna(s) (301, 302). The transceiver at the vehicle may transmit its route information to a control center (300) periodically or at a time when the control center requests it.

Referring to FIG. 3, the specific procedure in view of data unloading (also referred to as downloading) according to the present invention may be as follows.

Step 1: A vehicle arrives at a certain station (200) when the vehicle responds to the wake-up signal (S3010) which is sent by the certain station (200) (S3000). In case of the data unloading the vehicle sends the station (200) first without receiving the wake-up signal. In other words, when the vehicle arrives at the target station to which data the vehicle carries is destined, the vehicle may inform the station (200) of its arrival in unsolicited manner, Step 2: When responding back to the station's wake-up signal (S3010) or informing the station of its arrival in unsolicited manner, the vehicle may transmit information indicating that the vehicle is carrying data bulk designated for the station (200). Alternately, the control center (100) may inform the station (200) that the vehicle arriving at the station (200) is carrying the data bulk destined for the station (200).

Step 3: The station (200) may conclude the vehicle can be a transporter (300) carrying data bulk destined for the station (S3020, Yes) if the station receives information indicating that the vehicle carries the data bulk destined for the station from the vehicle or the control center (100).

Step 4: The station (200) may perform data unloading from the vehicle (S3030, 1). The station (200) may transmit a message indicating data unloading initiation to at least one of the vehicle and the control center (100). If the data uploading is complete, the station (200) may transmit a message indicating transporting completion of the data bulk to at least one of the vehicle and the control center (100) (S3030, 2).

<Aspect D. Delay QoS Control>

The proposed framework according to the present invention deals with bulky-sized data, and hence even a single loss due to an outage event is required to be fully recovered.

Figure 8:
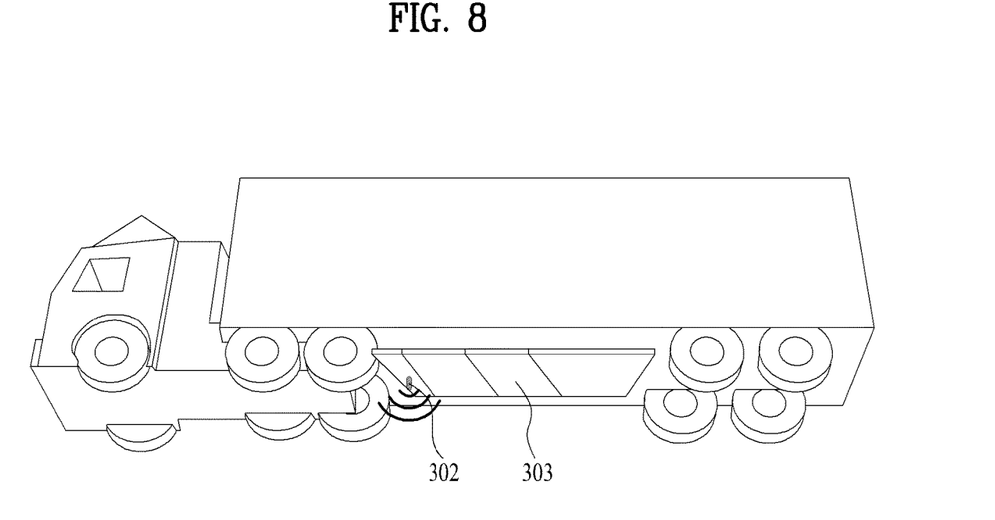
FIG. 8 and FIG. 9 show re-transporter that can be used for the present invention.
Figure 9:
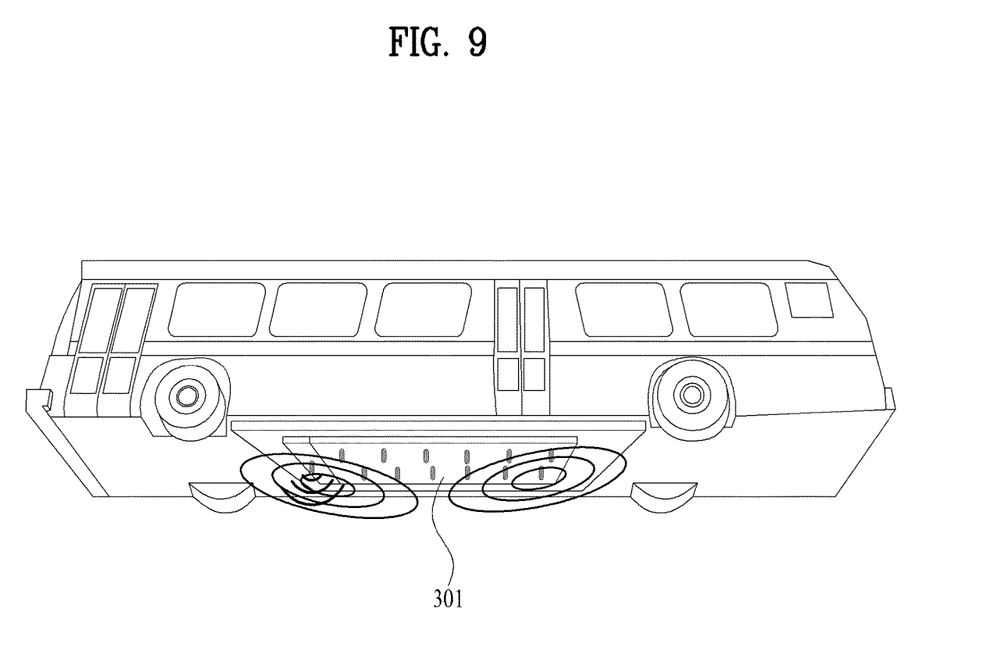

The present invention may adopts re-transporting the loss amount through dedicated vehicle(s) which is (are) able to carry much larger amount of data bulk(s) than general vehicles. Public transportations such as bus, having large size which is fit to load accumulated huge data and regularly operating in time, can be utilized for the same purpose. The control center (100) deploys a re-transporter to a station of which loaded data is in loss, whereby the re-transporter transfers the data loss to a designated station for the data transportation. FIG. 8 and FIG. 9 show re-transporter that can be used for the present invention. Especially FIG. 8 shows exemplarily a dedicated re-transporter with storage swap transceiver, and FIG. 9 shows exemplarity a bus re-transporter with 60 GHz antenna array transceiver. Other types of re-transporter which equips with a transceiver different from the storage swap transceiver and the antenna array transceiver may be used in the present invention.

D-1. Dedicated Re-transporter

Delay QoS of data bulks is guaranteed by the aid of control center (100). The parameters for adopting re-transporter(s) may be given as follows.

$\theta$: delay threshold of a data bulk $T_{max}$: maximum data transporting time by re-transporter (s)

$I_{RT}$: operating time interval of re-transporter(s)

$\theta_{RT}$: re-transportation threshold of a data bulk, defined as $\theta-(T_{max}+T_{RT})$ Referring to FIG. 3, the procedure which adopts a re-transporter may be given as follows.

Control center (100) may have a table keeping all the records of data transportation(s) in progress. The control center (100) may provide station(s) connected to the control center (100) with information on transportation(s) in progress (S3040).

Station(s) (200) may keep the copies of the transported data bulk(s) until receiving transporting completion message(s) of the data bulk(s) from control center.

If transportations cannot be completed within the corresponding delay thresholds of data bulks (elapsed time exceeds re-transportation threshold, i.e., $t>\theta_{RT}$), the control center (100) may send request(s) to the station(s) accordingly for re-transporting the data losses via re-transporter(s). The control center may request a station (200) to re-transport the lost part of data or the whole data.

Unlike the usual transporter which travels randomly or according to a fixed route regularly and thus the control center cannot change its route, the dedicated re-transporter may be deployed to a station by a control center (100) when data from the station to another station is in loss.

D-2. Partially Dedicated Re-Transporter Via Public Transportation

The operation procedure according to an embodiment of the present invention which utilizes a partially dedicated re-transporter via public transportation such as buses, subways and so on is the same as the case in the Aspect D-1. The only difference, which should be redesigned, may be re-transportation threshold $\theta_{RT}$ due to the changes on maximum data transporting time and operating time interval of re-transporters.

The control center (100) can easily know the routes of public transportation and arrival times of the public transportation at a station (200) and thus easily request the station (200) to upload lost data on a re-transporter passing by the station (200) that uploaded the lost data before and a specific station that the lost data is destined to.

In the Aspect D of the present invention, the control center may request a station (200) to re-transport the lost part of data or the whole data in question. A station (200) may not have to differentiate between the transporter and the re-transporter when the whole data has to be re-transported. In the Aspect D-1 of the present invention, the control center may request the re-transporter to move to the station (200), downloading data from the station (200) and go to a specific station to which the data is destined to.

If the re-transporter moves according to a fixed route and a fixed time schedule, the re-transporter may be operated in the same manner as the usual transporter (300) as described referring to FIG. 3 except that the data transportation using the re-transporter would be initiated by a wake-up signal transmitted or unicast by the control center (100) might transmit instead of a wake-up signal broadcast by a station (200). The wake-up signal from the control center (100) may include information designating a source station that wants to transfer data in the station to another station and/or information designating a target station that data from the source station is destined to.

The source station or the target station may be configured to operate in the same manner as described FIG. 3, except that the re-transporter may transmits a response signal to the source station or the target station even before the re-transporter receives a wake-up signal from the source station or the target station, in order to unify the data up/downloading via a transporter and via a re-transporter, thereby reducing implementation complexity of a station. To do this, the re-transporter may transmit route information to the station as the transporter does.

According to any one of Aspect A to D of the present invention stated above, the present invention may utilize cars traveling randomly or regularly as dominant transports by exploiting their traveling routes information. As described in the Aspect A and the Aspect B, the present invention enables much larger number of available transporters, compared to the one only making use of WiFi-enabled buses, which travel in fixed paths at (almost) regular time, as delay-tolerant data transporters. The present invention may be applicable to not only delay-tolerant data but also bulky-sized data at the same time, ensuring high traffic offloading rate despite of huge mechanically transporting delay. Furthermore, the present invention proposes two novel transceiver designs accordingly as described in the Aspect C. The present invention provides specific infrastructures and methods in high-level perspectives to guarantee QoS as described in the Aspect A or the Aspect D.

The present invention is advantageous in that the present invention fundamentally ensures independency of IP backhauls, resulting in huge offloading capacity without being restricted by IP traffic bust and inexpensive operating cost as well. In more particular, the present invention can make the network fundamentally free frame IP backhaul dependency while providing inexpensive operating cost by exploiting vehicular traffic as sources of data transportations, guarantee stable delay QoS by maneuvering randomness of vehicles via control center which is operating in a centralized manner and connected to stations by means of cellular backhauls or wireless links, and ensure still huge offloading capacity by handling bulky-sized data and long traveling delay of transporters.

Figure 10:
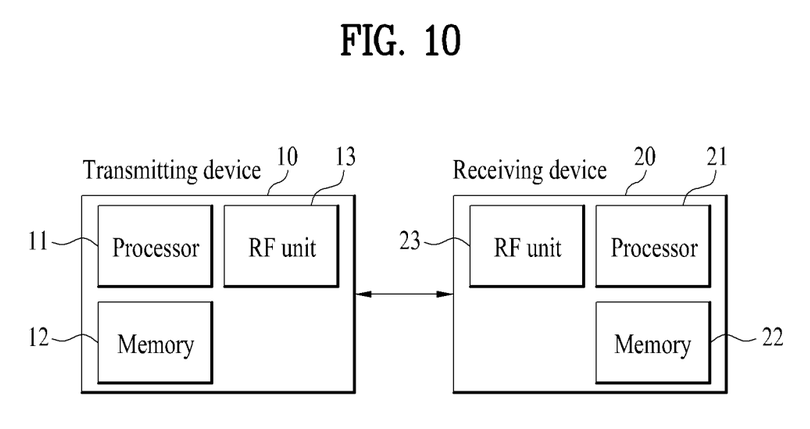
FIG. 10 shows a block diagram illustrating components of a transmitting device (10) and a receiving device (20) that may perform the present invention.

FIG. 10 shows a block diagram illustrating components of a transmitting device (10) and a receiving device (20) that may perform the present invention.

The transporter, re-transporter, station and control center according to the present invention serve as a transmitting device when transmitting or uploading signals such as control signal, message and data to an external device. The transporter, re-transporter, station and control center according to the present invention serve as a transmitting device when receiving or downloading signals such as control signal, message and data from an external device. For example, the transporter and re-transporter serve as a transmitting device (10) when unloading data to a station (200), and the station serves as a receiving device (20) when unloading data from a transporter or a re-transporter. In contrast, the transporter and re-transporter serve as a receiving device (20) when a station (200) loads data to the transporter and re-transporter, and the station (200) serves as a transmitting device (10) when uploading data to a transporter or a re-transporter.

The transmitting device (10) and the receiving device (20) include a radio frequency (RF) unit (13, 23), a processor (11, 21) and a memory (12, 22). The processor (11, 21) is configured to perform the present invention by controlling the components of the transmitting device (10) and the receiving device (20). The RF unit (13, 23) may be configured to receive or download information, data, signals and/or messages under the control of the processor (11, 21). The RF unit (13, 23) and/or for transmit or upload information, data, signals and/or messages under the control of the processor (11, 21). The transceiver described in the present invention may be the RF unit (13, 23). The RF unit (13, 23) is equipped with antenna(s) or antenna array, and transmits/receives signals through the equipped antenna(s) or antenna array.

The antenna or the antenna array transmit signals to the outside or receives signals from the outside. Each antenna may correspond to one physical antenna or may be configured into a combination of more than one physical antenna element. In either case, the signal transmitted from each antenna is not designed to be further deconstructed by another antenna at receiving device (20). If the RF unit (13) of the transmitting device (10) and/or the RF unit (23) of the receiving device (20) support a multiple input multiple output (MIMO) function using a plurality of antennas, each of them may be connected to two or more antennas.

The processor (11, 21) generally provides overall control the components of the transmitting device (10) and the receiving device (20). The processor (11, 21) may be also referred to as controllers, microcontrollers, microprocessors, microcomputers, etc. The processor (11, 21) may be configured in hardware, firmware, software, or their combination. In a hardware configuration, the processor (11, 21) may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processor (11, 21), or may be stored in the memory (12, 22) and driven by the processor (11, 21).

The memory (12, 22) may store control signals, messages and data bulk described in the present invention. The memory (12, 22) may store programs required for signal processing and controlling of the processor (11, 21) and temporarily store input and output information. The memory (12, 22) may be implemented by a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for uploading data by a first fixed station, the method comprising:
broadcasting, by the first fixed station, a wake-up signal;
receiving, from a vehicle by the first fixed station, a response signal including route information of the vehicle different from the first fixed station in response to the wake-up signal, the route information indicating a route of the vehicle; and
uploading, by the first fixed station, data destined for a second fixed station, which is different from the first fixed station and the vehicle, onto the vehicle when the received route information includes the second fixed station on the route that the vehicle will take.

2. The method of claim 1, further comprising:
transmitting a message indicating transportation initiation of the data destined for the second fixed station to a control center.

3. The method of claim 1, further comprising:
retrieving, from a control center, an optimal route to a final destination of the vehicle,
wherein the data destined for the second fixed station is uploaded onto the vehicle when the optimal route of the vehicle is the same as the received route information and the received route information includes the second fixed station on the route that the vehicle will take.

4. The method of claim 1, further comprising:
retrieving, from a control center, an optimal route to a final destination of the vehicle; and
updating the received route information with the optimal route of the vehicle when the received route information and the optimal route of the vehicle are different,
wherein the data destined for the second fixed station is uploaded onto the vehicle when the updated route information includes the second fixed station on the route that the vehicle will take.

5. The method of claim 1, further comprising:
receiving a control signal requesting the first fixed station to re-transport a part of the data destined for the second fixed station via a re-transporting vehicle;
uploading the part of the data destined for the second fixed station on the re-transporting vehicle.

6. A method for downloading data by a vehicle, the method comprising:
receiving, by the vehicle, a wake-up signal;
transmitting, by the vehicle, a response signal including route information of the vehicle to a first fixed station different from the vehicle in response to the wake-up signal, the route information indicating a route of the vehicle;
downloading, by the vehicle, data destined for a second fixed station, which is different from the first fixed station and the vehicle, from the first fixed station when the route information includes the second fixed station on the route that the vehicle will take; and uploading, by the vehicle, the data destined for the second fixed station to the second fixed station when the vehicle arrives at the second fixed station.

7. The method of claim 6, wherein the wake-up signal is received from the first fixed station or a control center to which the first fixed station and the vehicle is connected.

* * * * *